United States Patent [19]
Kirshtein

[11] Patent Number: 6,078,974
[45] Date of Patent: Jun. 20, 2000

[54] METHOD AND APPARATUS FOR EXTENSION OF BI-DIRECTIONAL OPEN COLLECTOR SIGNALS IN A MULTIPLEXED DATA TRANSMISSION SYSTEM

[75] Inventor: Philip M. Kirshtein, New Market, Ala.

[73] Assignee: Cybex Computer Products Corporation, Huntsville, Ala.

[21] Appl. No.: 09/057,002

[22] Filed: Apr. 8, 1998

[51] Int. Cl.[7] .................................................. G06F 15/16
[52] U.S. Cl. ........................... 710/101; 709/1; 709/227; 710/14; 710/65; 710/72; 710/73; 359/154
[58] Field of Search ................................ 710/65, 67, 14, 710/101, 72, 73; 709/1, 227; 341/177; 359/154

[56] References Cited

U.S. PATENT DOCUMENTS

| | | | |
|---|---|---|---|
| 4,543,642 | 9/1985 | Hansen | 710/127 |
| 4,885,718 | 12/1989 | Asprey et al. | 710/101 |
| 5,457,784 | 10/1995 | Wells et al. | 710/9 |
| 5,587,824 | 12/1996 | Asprey | 359/154 |
| 5,602,595 | 2/1997 | Citta et al. | 348/495 |
| 5,615,393 | 3/1997 | Kikinis et al. | 710/67 |
| 5,621,734 | 4/1997 | Mann et al. | 709/227 |
| 5,815,109 | 9/1998 | Tan | 341/177 |
| 5,859,545 | 1/1999 | Thornblad | 326/90 |
| 5,870,395 | 2/1999 | Baran | 370/395 |
| 5,974,058 | 10/1999 | Burns et al. | 370/538 |
| 6,014,040 | 1/2000 | Tracy | 326/90 |

*Primary Examiner*—Thomas C. Lee
*Assistant Examiner*—Tammara Peyton
*Attorney, Agent, or Firm*—Nixon & Vanderhye P.C.

[57] ABSTRACT

An apparatus, method, and system for providing a virtual open collector circuit for a connection between a computer and computer peripherals, such as a mouse or keyboard, where peripheral data is transferred over a bidirectional communications system. The peripherals are located at distances from the computer greater than possible using typical computer cables. The apparatus has an arbitration means and a means for avoiding a lock-up condition.

11 Claims, 3 Drawing Sheets

REMOTE SITE / LOCAL SITE

METHOD AND APPARATUS FOR EXTENSION OF BI-DIRECTIONAL OPEN COLLECTOR SIGNALS IN A MULTIPLEXED DATA TRANSMISSION SYSTEM

FIELD OF THE INVENTION

This application relates to an extension system for open collector circuits used for a connection between a computer and computer peripherals such as a mouse or keyboard. When the computer is located at a first site and the peripherals at a second site the extension system provides a way to transfer data in a manner transparent to the user and has a means for avoiding a lock-up condition which may occur when bidirectional data is transmitted over an extension system.

BACKGROUND OF THE INVENTION

A personal computer is typically coupled to peripherals that serve as computer-user interfaces. Such peripherals may include a keyboard, a mouse, and a monitor. Typically standard cables connecting each peripheral are around four feet long. Because of the characteristics of the connecting cables and their interfaces, the cables do not provide a reliable peripheral connection when they are much longer than twenty feet.

There are situations where it is desirable to separate the computer from the peripherals at distances much greater than allowed by typical standard peripheral cables. The apparatus to extend the distance between a computer and peripherals is called an extender or an extension system. One such system, PC-Extender Plus is available from Cybex Computer Products of Huntsville, Ala. The PC-Extender Plus allows a keyboard, monitor, and mouse to be placed up to 600 feet away from the computer. An extender typically has two electronic boxes and several cables between the computer and the peripherals. As the demand for extenders increases, the need for more efficient use of cables has developed.

In existing extenders, standard coaxial cables, shielded cables, and unshielded cables serve as communication channels. In addition, custom cables have been developed to provide an improved communication channel for some extender systems. The cables connecting the computer to the peripherals may be confined in a binder or may be separate cables for each of the desired connections. The apparatus or electronic boxes connected to the ends of each cable serve as interfaces between the computer and the cable at one end and the peripherals and the cable at the other end.

A recently developed digital system for extending computer peripherals is described in U.S. application Ser. No. 08/971,223 filed on Nov. 15, 1997 still pending and is assigned to the assignee of the present invention and is hereby incorporated as a reference herein. One of the problems occurring in the recently developed system was the coupling of open collector circuits between the computer and peripherals in a way that was compatible with existing hardware and operationally transparent to a computer user. A similar problem occurs in analog extension systems and was solved as described in U.S. Pat. No. 5,587,824 issued to Asprey. In Asprey an arrangement of analog circuit elements is used to allow a long wire to appear as a short wire to open collector circuits. The recently developed system of application '223 provides a bidirectional data flow using a half duplex transmission method and placing peripheral bits in data packets. Because the recently developed digital system converts analog signals to digital signals, transmits the digital signals in packets, then converts the digital signals back to analog signals the invention of Asprey is not applicable.

Accordingly, it is the object of this invention to provide a means for coupling open circuit collector circuits in a manner that is transparent to the user and does not add significant cost to a digitally based extension product. To provide such a means requires the development of an algorithm, method, or apparatus within the framework of the recently developed system or other bidirectional data communication system. Such a solution should function as a virtual wire to the user and perform essentially as a short piece of wire typically used to couple open collector circuits.

DESCRIPTION OF THE PREFERRED EMBODIMENT

Figure 1:
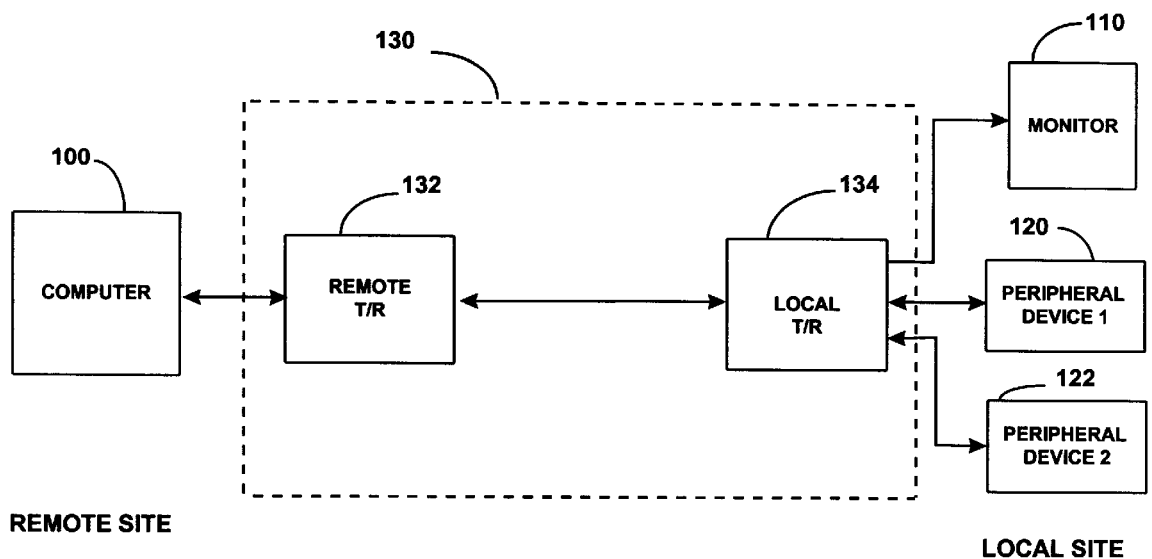
FIG. 1 is a block diagram illustrating a computer coupled to peripherals via an extension system in accordance with the present invention.

FIG. 1 illustrates a computer 100 coupled to a monitor 110, a first peripheral 120, and a second peripheral 122. A bidirectional data transmission system 130 having a remote transmitter/receiver 132 and a local transmitter/receiver 134 provides an information path for the computer 100 to exchange information with computer elements. The bi-directional data flowing between the remote transmitter/receiver 132 and the local transmitter/receiver 134 are placed in high-speed packets. Details of one such bi-directional data transmission system is described in the above mentioned U.S. application Ser. No. 08/971,223 assigned to the assignee of the present invention. The bidirectional data transmission system described in '223 is a half-duplex transmission system. Because other data transmission systems, such as a full-duplex transmission system, may serve as a communication channel for the present invention the use of a half-duplex transmission system is not a limitation.

Figure 2:
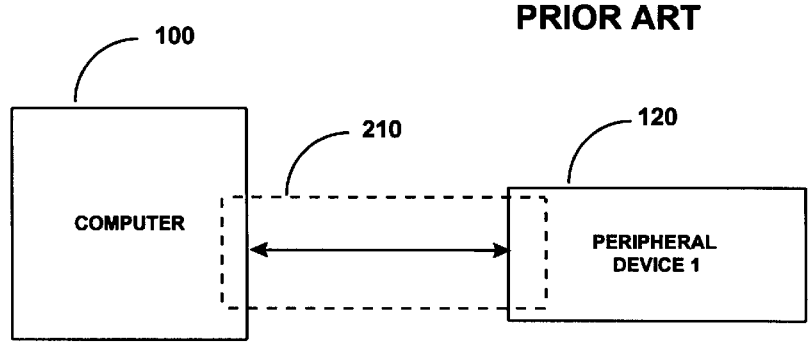
FIG. 2 is a block diagram illustrating a prior art coupling of a peripheral device to a computer.

A block diagram illustrating a prior art computer to peripheral coupling is shown in FIG. 2. The computer 100 and the first peripheral device 120 exchange bidirectional information using prior art coupling link 210. The prior art coupling link comprises a circuit in the computer, a piece of cable, and a circuit in the peripheral device. The first peripheral device may be a computer mouse and the piece of cable a wire in the cord connecting the computer mouse to the computer. The first peripheral device may also be a keyboard or similar device that use an interface circuitry contained in a mouse.

Figure 3:
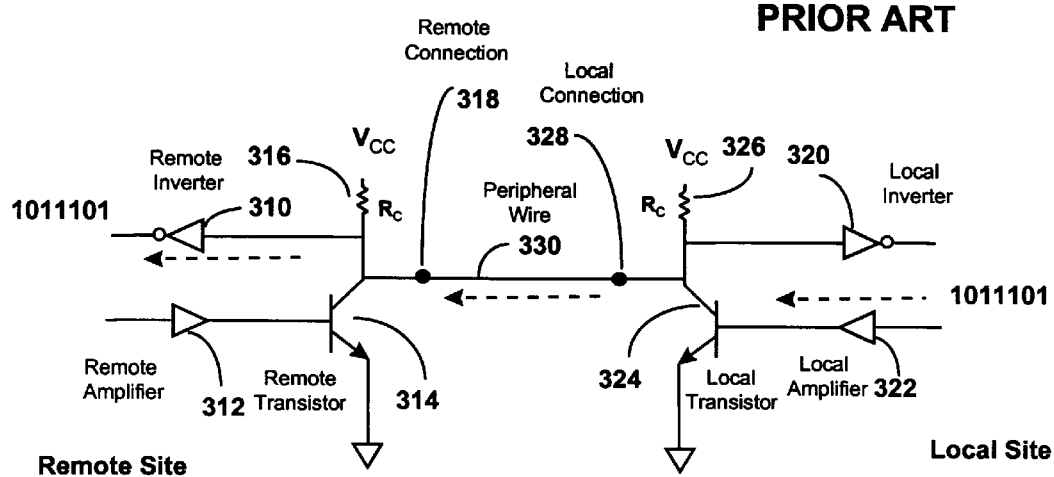
FIG. 3 is a schematic illustrating a prior art connection.

Referring now to FIG. 3, a prior art circuit, there is shown a peripheral cable 330 connected on one end to the collector of a remote transistor 314 and connected on the other end to the collector of a local transistor 324. Also shown and functionally arranged are elements known to those skilled in the art including a voltage supply, collector resistors 316, 326, inverters 310, 320, and amplifiers 312, 322. In the prior art circuit, data may be transferred bi-directionally.

A serial data stream is shown, represented as binary ones and zeros, entering the local amplifier 322. When a binary one is asserted and is applied to the local amplifier the base of the local transistor is biased and pulls the collector to ground potential. The value of voltage at the local connection point 328, on the peripheral cable 330, and at the remote connection 318 is essentially at ground potential. Remote inverter 310 converts the ground potential level at remote connection point 318 to an output voltage representing a binary one. When the next value of the serial data stream, now a binary zero, is applied to the local amplifier 322, the local transistor 324 is biased to an off condition. The voltage at the local connection 328, on the peripheral cable 330, and at the remote connection 318 moves from the ground potential representing a binary zero to approximately $V_{CC}$ representing a binary one. The remote inverter 310 converts the binary one to a binary zero. As the off-on process continues at the local transistor 324 in response to the transmitted local serial data, the output of the remote inverter 310 becomes remote received serial data having the same bit pattern as the input to the local amplifier 322. In summary, data is transferred from the remote site to the local site using remote amplifier 312, remote transistor 314, the peripheral cable 330, and the local inverter 320. The peripheral wire 330 is a piece of wire contained in a peripheral cable connecting a peripheral to a computer. Those familiar with computers would recognize, for example, the piece of wire as one of the wires in a mouse cable or a keyboard cable.

Figure 4:
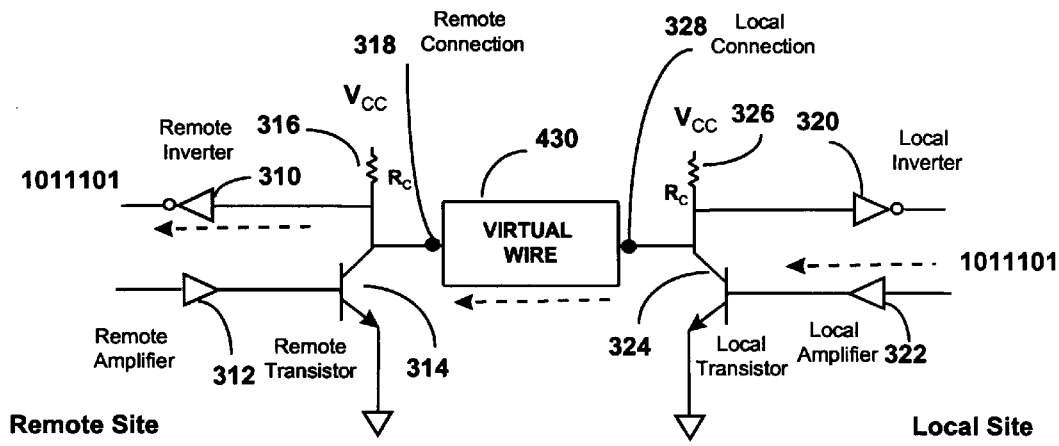
FIG. 4 is a schematic illustrating an embodiment of the present invention.

FIG. 4 illustrates a virtual wire 430 serving as the peripheral wire 330 for coupling circuit elements at the remote site to the local site. The virtual wire of the present invention uses a bidirectional data communication system as a link between local processing elements and remote processing elements. The processing elements include state machines and logic equations plus interface circuits to provide the appropriate voltages at the remote connection 318 and the local connection 328. The state machines and logic equations of the present invention may be implemented using discrete logic, a programmed logic array, a programmed microprocessor, or similar devices. The interface circuits are typically comprised of amplifiers and inverters and well known by those skilled in the art. The state machines and logic equations serve as a means for transmission, arbitration, and a means for avoiding a latch-up condition and are essential elements of the present invention.

Figure 5:
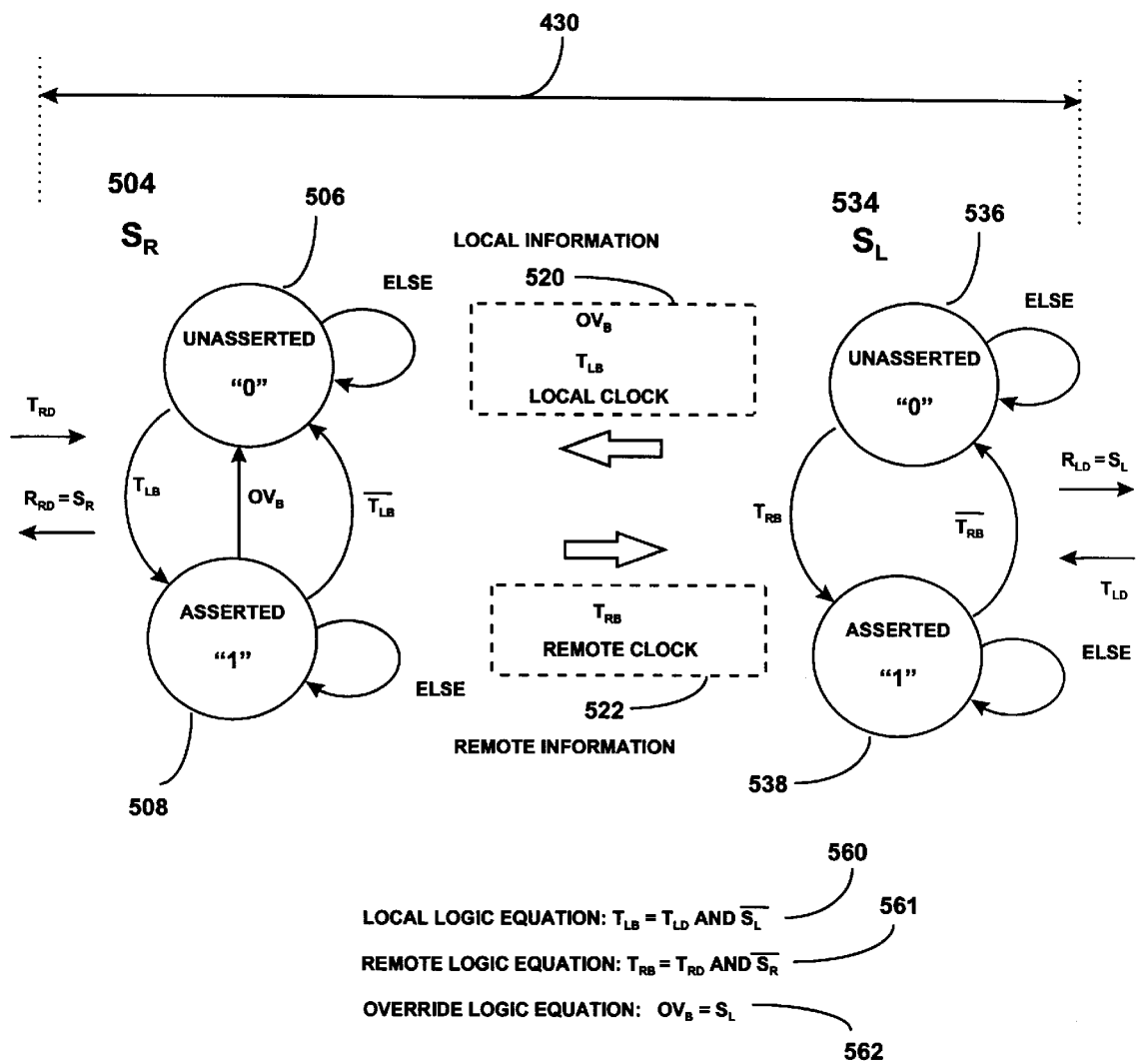
FIG. 5 is a state diagram illustrating an embodiment of the present invention.

To assist with an understanding of the present invention, as illustrated in FIG. 5, the following notation is used:

$S_R$-state of the remote state machine;
$S_L$-state of the local state machine;
$R_{RD}$-received remote data at the remote site;
$R_{LD}$-received local data at the local site;
$T_{RD}$-transmitted remote data from the remote site;
$T_{LD}$-transmitted local data from the local site;
$T_{RB}$-transmitted remote bit from the remote site;
$T_{LB}$-transmitted local bit from the local site; and
$OV_B$-override bit.

Referring now to FIG. 5 there is shown a local state machine 534 and a remote state machine 504. The remote state machine 504 has an asserted state 508, binary one, and an unasserted state 506, binary zero and the local state machine 534 has an asserted state 538, binary one, and an unasserted state 536, binary zero. The local state machine goes from the unasserted state 536 to the asserted state when $T_{RB}$ is asserted, else remains in the unasserted state. The local state machine 534 goes from the asserted state 538 to the unasserted state when $T_{RB}$ is unasserted else remains in the asserted state. Similar state changes occur in the remote state machine as shown in FIG. 5. However the remote state machine has an additional means of changing states, when the override bit, $OV_B$, is asserted the remote state machine transfers from the asserted state 508 to the unasserted state 506. The override bit serves to keep the system from having a lock-up condition due to a positive feedback relation between the two state machines.

Initially, when no data has been transferred for a period of time, both state machines are in the unasserted state. When data is sent from the local site $T_{LD}$ is a sequence of bits. The first bit of the sequence, assumed to be a binary one, is converted to a transmitted local bit, $T_{LB}$, according to the local logic equation 560. The LOCAL CLOCK and $T_{LB}$ are transmitted to the remote state machine 504 over the bidirectional transmission system 130. The remote state machine 506, being in the unasserted state 506, then changes to the asserted state 508 and the remote received data has a first bit in an output sequence equal to binary one. When the second bit of $T_{LD}$, which may be a binary zero or a binary one, is processed then the local logic equation again generates a new transmitted local bit. The new transmitted local bit becomes the second bit of the remote received data in accordance with the operation of the local logic equation 560 and the remote state machine 504. When all the transmitted local data has been transferred both state machines return to an unasserted state.

Transmitted remote data, $T_{RD}$, is transferred to the local site over the bidirectional transmission system using remote logic equation 561 and the local state machine 534. When the transmitted remote bit and REMOTE CLOCK arrive at the local site, the local state machine goes to the state as shown in FIG. 5. Received local data appears as a sequence of bits at the local site.

In summary, the state machines of FIG. 5 are initially in an unasserted state. If local data is transmitted from the local site to the remote site the state of the local state machine and the values of the data, according to the local logic equation 560, determine the value of the bit transmitted over the bidirectional transmission system to the remote state machine 504. The local logic equation and remote state machine process one bit at a time sequentially generating received remote data at the remote site. Data is transferred from the remote site to the local site in a similar manner. When interface circuits at the local and remote sites assure the outputs are coupled at the correct voltage level to the collectors of the remote transistor 314 and the local transistor 324, the state machines and logic equations serve as the virtual wire 430.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims:

We claim:

1. In an extension system for transferring local data from a local site to a remote site using a virtual open collector circuit between the local site and the remote site, the method comprising the steps of:

sampling a data bit at the local site at a local clock rate into a stream of local samples corresponding to the data bit;

at each sample clock, determining a local state condition $S_L$ of the site; creating a local transmission bit for each local sample as a function of both the local sample and $S_L$;

transmitting the local transmission bit to the remote site;

determining whether to reset a state condition of the remote site to avoid a bi-stable latch-up condition of the virtual open collector circuit; and repeating the generating, determining, creating, and transmitting steps for data bits at the remote site sampled into remote samples at a remote clock rate and converted into remote transmission bits as a function of both a remote state condition and the remote sample.

2. The method of claim 1 wherein the local data is from a computer peripheral.

3. An extension system for transferring local data from a local site to a remote site using a virtual open collector circuit between the local site and the remote site, comprising:

a generator at the local site for receiving a data bit, sampling the data bit into a stream of local samples, and determining a local state condition of the local site and transmitting to the remote site a combined signal each being a combination of a current local sample with a current local state condition; and a remote state machine at the remote site receiving the combined signal and the local state condition and therefrom decoding the data bit and determining whether to reset a remote state condition of the remote state machine to avoid a bi-stable latchup condition of the virtual wire.

4. The method of claim 3 wherein the local data is from a computer peripheral.

5. In an extension system for transferring data between a local site and a remote site where the data is transferred over a bidirectional data transmission system, an apparatus for providing a virtual open collector circuit between the local site and the remote site, the apparatus comprising:

a local generator at the local site for generating a stream of local data bits and creating a logic state local signal for each local data bit to satisfy the equation $T_{LB}=T_{LD}$ AND $S_L$ where $T_{LB}$ is the created local logic state signal, $T_{LD}$ is a current local data bit, and $S_L$ is a current state condition of a local state machine;

a remote state machine at the remote site receiving $T_{LB}$ and $S_L$ from the local site, and decoding the stream of local data bits from $T_{LB}$ and making a reset decision of a state condition of the remote state machine based on $S_L$;

a remote generator at the remote site for generating a stream of remote data bits and creating a logic state remote signal for each remote data bit to satisfy the equation $T_{RB}=T_{RD}$ AND $S_R$, where $T_{RB}$ is the created remote logic state signal, $T_{RD}$ is a current remote data bit, and $S_R$ is a current remote condition of the remote state machine; and the local state machine at the local site receiving $T_{RB}$ and $S_R$ from the remote site, and decoding the stream of remote data bits from $T_{RB}$ and making a reset decision of a state condition of the local state machine based on $S_R$.

6. The method of claim 5 wherein data from the local site is generated by a computer peripheral and data from the remote site is generated by a computer.

7. The method of claim 6 wherein the computer peripheral is a mouse.

8. The method of claim 5 wherein the local generator further generates an override bit where the override bit serves as a means for avoiding a latch-up condition.

9. A virtual wire communication link between a computer and a peripheral normally associated with the computer, comprising:

a master state machine bi-directionally communicating with the peripheral via a first link, oversampling a logic state of the first link and providing a master combined result of a combination of the oversampling with a determined master state condition;

a slave state machine, communicating with the master state machine via a dedicated channel and bi-directionally communicating with the computer via a second link, for receiving the master combined result from the master state machine via the dedicated channel, mimicking the logic state of the first link based on the master combined result, and driving the second link to the computer with the mimicked logic state of the first link;

the slave state machine also oversampling a logic state of the second link and providing a slave combined result of a combination of the oversampling with a determined slave state condition;

the master state machine also receiving the slave combined result from the slave state machine via the dedicated channel, mimicking the logic state of the second link based on the slave combined result and driving the first link to the peripheral with the mimicked logic state of the second link.

10. A virtual wire communication system as in claim 9, wherein:

the master state machine also periodically sends in addition to the master combined result the master state condition to the slave machine via the dedicated channel; and the slave state machine receives the master state condition and based on the master state condition resets its own state condition to avoid a bi-stable latch up of the virtual wire.

11. A virtual wire communication system as in claim 1, wherein the local transmission bit satisfies the logic equation $T_{LB}=T_{LD}$ AND $S_L$, where $T_{LB}$ is the local transmission bit and $T_{LD}$ is the local sample.

* * * * *